United States Patent

[11] 3,553,348

| [72] | Inventor | Joseph E. Betts |
| | | Westport, Conn. |
| [21] | Appl. No. | 591,415 |
| [22] | Filed | Nov. 2, 1966 |
| [45] | Patented | Jan. 5, 1971 |
| [73] | Assignee | General Electric Company |
| | | a corporation of New York |

[54] POLYMERIC BLENDS FOR INSULATION COMPOSITION
10 Claims, No Drawings

[52] U.S. Cl. .................................................. 174/110,
252/63.2, 252/63.5, 252/66; 260/41
[51] Int. Cl. ........................................................ H01b 3/44
[50] Field of Search .......................................... 252/511,
63.5, 63.7, 66; 260/41; 174/110

[56] References Cited
UNITED STATES PATENTS

| 2,928,802 | 3/1960 | Rehner, Jr. et al. | 260/41.5 |
| 3,259,688 | 7/1966 | Towne et al. | 174/127 |
| 3,260,694 | 7/1966 | Wanz | 174/110.44 |
| 3,148,169 | 9/1964 | Martens et al. | 260/41 |

OTHER REFERENCES

Fischer, " Improved Physical & Electrical Strength etc." Paper presented in Chicago Sept. 3, 1964 Meeting 86 A.C.S., Inc. Applicant's citation.

*Primary Examiner*—John D. Welsh
*Attorneys*—R. Jonathan Peters, Frank L. Neuhauser, Oscar B. Waddell and Joseph B. Forman

ABSTRACT: Disclosed is an electrical insulating composition for wire and cable comprising a cross linked ethylene copolymer having about 75 percent to 90 percent by weight of ethylene, a chlorine-containing polymer and a filler of magnesium silicate having a platelike structure and being coated with an alkoxy silane. Upon cross-linking the composition is characterized by a tensile strength at 150° C. of not less than 800 lbs./sq. in. and a dielectric strength of not less than 1,000 volts/mil.

POLYMERIC BLENDS FOR INSULATION COMPOSITION

This invention relates to an improved insulating composition, and more particularly to electrical wire and cable insulated with such a composition.

Thermosetting or cross linked polyethylene compositions are well known and have been used extensively, especially for insulation materials for wire and cable. In the conventional manufacture of wire and cable employing such insulation materials, a filler and other additives are incorporated into the polyethylene, the compounded admixture is subsequently fabricated as an insulation coating and then cured to form a thermosetting cross linked coating. The physical properties and performance characteristics of the insulation materials depend primarily upon the application, and the compounding procedure is varied according to the properties required.

However, polyethylene which is cross linked has a tolerance level for the filler material and a relatively low flame retardance. In addition, polyethylene which is cross linked can be processed only at moderate speeds, and for thin walled structures, is difficult to process which can result in a relatively high degree of waste. This is overcome, at least in part, by fabricating the composition at relatively slow speeds, or by fabricating relatively thicker insulation wall dimensions, but both procedures add considerably to the cost of the final product. As a consequence, improved products overcoming to some extent certain disadvantages have been developed by employing a copolymer blend and/or by using special or treated fillers.

Moreover, lead wire adaptable for transmitting relatively low voltage loads, i.e., below 300 volts, presents additional problems because of the relatively small dimension for the wire and especially for the necessity of employing as thin an insulation wall as possible. Lead wire of this type is used, for example, for fluorescent lamp ballasts, small motors and electrical appliances such as refrigerators, washing machines, etc. Lead wire for applications of this type should demonstrate performance for continuous service at certain designated elevated temperatures as established by Underwriter's Laboratories. This is determined by heat aging a sample of the wire at one or more elevated temperatures for a specified period of time, and then the physical properties of the aged sample are measured, such as percent retention of elongation or tensile strength. For example, it is common to employ lead wire insulated with neoprene having a one thirty-seconds inch wall thickness. According to Underwriter's Laboratories standards, this wire has a temperature rating of 90° C., which means that the wire is listed for service at 90°C. Wire insulated with cross linked polyethylene compositions at one thirty-seconds inch wall thickness has a 105°C. rating, but the polyethylene wire is more expensive than the neoprene wire. Heretofore it has not been possible to fabricate insulation containing a large proportion of cross linked polyethylene for a lead wire having a wall thickness less than one thirty-seconds inch without using a braid or sheath. If the braid or sheath is omitted from the wire construction, the wire insulation will not exhibit sufficient physical strength or flame retardance to meet the stringent requirements published by Underwriters' Laboratories. On the other hand, manufacturing such thin walled wire products with a braid or sheath is time consuming and expensive.

This invention has as its purpose to provide an insulation composition which exhibits improved physical properties and performance characteristics, especially at elevated temperatures, and is particularly useful in the fabrication of relatively thin wall structures. Other objects and advantages of the invention will become evident from the following description.

In accordance with the broadest aspect of this invention, there is provided an insulation composition comprising an ethylene copolymer having about 75 percent to 90 percent by weight ethylene, a chlorine-containing polymer, preferably chlorinated polyethylene, in sufficient quantity so that the chlorine content of said composition is not less than about 2 percent by weight based on the combined weight of the ethylene copolymer and chlorine-containing polymer, and a reinforcing filler consisting essentially of magnesium silicate treated with an alkoxy silane. In preparing the composition, the polymers, reinforcing filler, alkoxy silane and other desired additives are intimately admixed as in a Banbury. During this compounding operation, the filler becomes treated by the alkoxy silane whereby the problem of electrical stability of filler in water is overcome. A suitable curing agent, desirably a tertiary peroxide, is then incorporated into the admixture to effect curing of the polymeric compounds. The resulting composition is amenable to relatively rapid processing and rapid cure rate as compared to a homopolymer of polyethylene, and upon curing exhibits improved physical and electrical properties and performance characteristics, especially at elevated temperatures, discussed hereinafter in greater detail. As a further significant advantage the composition of this invention can be readily fabricated as insulation for wire in relatively thin dimensions, e.g. one sixty-fourth inch, thereby obviating the need of a braid or sheath.

As pointed out above, cross linked polyethylene even when used in conjunction with a reinforcing filler exhibits certain disadvantages or short comings. According to my invention, I employ an ethylene copolymer which improves the processability of the composition and further facilitates increased filler-polymer interaction or filler tolerance thereby resulting in a product of improved physical strength and electrical properties. Suitable copolymers with ethylene include, for example, vinyl acetate, ethyl acrylate and butene-1 wherein the copolymer comprises 75 percent to 90 percent by weight polyethylene. In the preferred embodiment, I employ a copolymer consisting of about 75 percent to 90 percent by weight ethylene and 10 percent to 25 percent by weight vinyl acetate. As compared to a homopolymer of polyethylene, the vinyl acetate attributes to superior processability and faster cure rates, and consequently the insulation can be processed or fabricated at relatively high speeds. Equally important, the copolymer increases substantially the tolerance for a reinforcing filler thereby making it possible to increase the amount of filler used in the insulation composition. As a result, the cured composition is characterized by a marked increase in toughness and in electrical properties. When a copolymer is employed having less than approximately 75 percent by weight ethylene monomer, the final cured product does not exhibit sufficient physical properties, such as tensile strength. On the other hand, a copolymer containing more than about 90 percent ethylene will not exhibit the desired processing properties and rapid cure rate considered particularly desirable with respect to fabrication. Still further, the tolerance for the reinforcing filler is decreased with an increasing amount of ethylene monomer. An optimum balance of these properties is achieved, for example, with a composition having about 80 percent to 85 percent by weight ethylene and about 15 percent to 20 percent by weight vinyl acetate.

The ethylene copolymer is blended with a chlorine-containing polymer such as chlorinated polyethylene, chloro-sulfonated polyethylene and polyvinyl chloride to promote flame retardance of the composition. It is known that the flame retardant properties of polyethylenic compositions may be enhanced by using a chlorine-containing polymer, but such compositions generally require large amounts of the chlorinated polymer. I have found quite unexpectedly that insulation composition made in accordance with this invention may employ as little as about 2 percent chlorine content based on the total weight of the polymeric blend comprising the ethylene copolymer and the chlorine-containing polymer. Generally, insulation made in accordance with my invention contains from about 2 percent to 8 percent by weight chlorine based on the total weight of polymers present, and more preferably about 3 percent to 5 percent by weight. Where compositions are made having less than about 2 percent chlorine present, the final cured product does not exhibit sufficient flame retardant properties. On the other hand, where more than about 8 percent by weight chlorine is used in preparing the composition of this invention, the higher quantities impair or degrade certain physical properties, most particularly heat aging. The chlorine-containing polymer is relatively more expensive than the polyethylene, and therefore, it is desirable to use the minimum chlorine content which will provide sufficient flame retardance to enable the cured composition to pass the flame test specified by Underwriters' Laboratories. The tensile strength of the final product generally is increased with an increased proportion of the unchlorinated copolymer, but at least a minimum content of about 2 percent by weight chlorine of the total polymeric composition is used to impart the desired flame retardance property to the product. Thus, the proportions for the ingredients may be varied within the specified limits to meet the mechanical properties and performance characteristics desired for an insulation composition.

A suitable filler consisting essentially of magnesium silicate having a platelike structure is incorporated with the polymeric materials. The filler useful in this invention typically contains certain impurities, especially metallic oxides, and it should be understood that the term magnesium silicate is used herein and in the appended claims is defined as a composition composed of at least about 95 percent by weight magnesium silicate and up to about 5 percent by weight inert impurities. In order to impart the desired properties to the cured composition, the magnesium silicate filler should not have a particle size greater than 6 microns, and desirably a specific surface area of 18 to 20 square meters per gram as determined by BET Gas Absorption Method, and also a specific gravity of about 2.7 to 2.8.

The function of reinforcing fillers in polymeric insulation compositions is well known. Primarily, the reinforcing filler increases the physical strength properties of the composition, including, for example, tensile strength and resistance to plastic flow at elevated temperatures. In addition, the filler enhances flame retardance and the dielectric strength of the cured product. The amount of filler incorporated into the composition therefore may be varied depending upon the properties desired in the cured product. However, because of the uniqueness of this composition employing an ethylene copolymer, I have found that the filler tolerance of the composition is substantially increased, and therefore, it is possible to vary the filler content over a relatively broad range. The filler content consisting essentially of magnesium silicate may be in the range of from about 25 percent to 45 percent by weight of the composition, and preferably from about 35 percent to 45 percent by weight. Where quantities less than the minimum specified are employed, the cured composition does not exhibit the desired physical properties such as tensile strength at elevated temperatures, e.g. 150° C. The maximum quantity of filler which can be incorporated into the polymeric composition is dependent upon the filler-polymer interaction. Generally, for a cross linked polyethylene composition, it is possible to introduce up to about 33 percent by weight filler material. By reason of this invention, the quantity of reinforcing filler can be increased substantially up to about 45 percent by weight. As a consequence, compositions exhibiting superior physical properties and performance characteristics, especially at elevated temperatures, may be produced.

The reinforcing filler is treated with an alkoxy silane and preferably an alkoxy silane selected from a group consisting of lower alkyl alkoxy silane, alkenyl alkoxy silane and alkynyl alkoxy silane. Halogenated silanes, such as the chloro-silanes, are not desirable because of their corrosive activity and deleterious effects on electrical properties. In practicing the invention, the reinforcing filler and alkoxy silane are added separately to the polymeric materials, and the admixture compounded as in a Banbury mixer. During this compounding operation, the alkoxy silane apparently coats or interacts with the reinforcing filler, which in turn apparently facilitates a filler-polymer interaction. The reinforcing filler is treated with about 0.2 percent to 3 percent by weight of alkoxy silane. An excess of alkoxy silane acts as a plasticizer, which consequently degrades the tensile strength and electrical properties for the cured composition, and therefore is avoided. Suitable alkoxy silanes include, for example, methyl ethoxy silane, methyl tris (2-methoxy ethoxy) silane, diethoxy silane, allyltrimethoxy silane, and the vinyl silanes such as vinyl tris (2-methoxy ethoxy) silane, vinyl trimethoxy silane and vinyl triethoxy silane.

A suitable curing agent is incorporated with the admixture during the compounding operation. In the typical compounding operation such as on a two-roll rubber mill or in a Banbury mixer, the polymeric materials are added first, than the filler and any other additive such as antioxidant, stabilizer, pigment, etc. and lastly the curing agent. The compounding operation is conducted within a temperature range high enough to render the admixture sufficiently plastic to work, but below the reacting temperature or decomposition temperature of the curing agent so that the curing agent will not decompose thereby causing at least partial curing or cross linking of the polymeric stock during the normal mixing cycle. Desirably, the curing agent employed in the operation is a peroxide, preferably a tertiary peroxide, and characterized by at least one unit of the structure

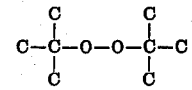

which decomposed at a temperature in excess of 130° C. The use of these peroxide curing agents in effecting cross linking in polymeric compounds is adequately described in U.S. Pat. Nos. 3,079,370 and 2,888,424, both to Precopio and Gilbert, which patents are incorporated in this specification by reference. Another useful curing agent includes the acetylenic high molecular weight diperoxy compounds disclosed in U.S. Pat. No. 3,214,422, which patent is also incorporated in this specification by reference.

The proportion of peroxide curing agent used depends largely on the mechanical properties sought in the cured product, for example, tensile strength at elevated temperatures, e.g. 150° C. A range of from about 0.5 to 10 parts peroxide by weight per 100 parts of total polymeric content satisfies most requirements, and the usual proportion is of the order of three to four parts peroxide. In a typical production operation employing a tertiary peroxide as a curing agent, compounding is conducted at a temperature of from about 100° to 130° C., and preferably from 100° to 120° C. If compounding is conducted at a temperature much higher than the stated maximum, the peroxide will decompose thereby causing premature curing of at least a portion of the polymeric compounds. As a consequence, the compound will be difficult to fabricate and the final product will exhibit an irregular or roughened surface. The resulting compounded admixture is subsequently fabricated as by extrusion to provide an insulation cover for wire or cable. The fabricated product is then cured such as by conventional steam curing at about 400° to 410° F. and 250 p.s.i.g.

The cured composition made in accordance with this invention exhibits superior properties not heretofore attainable with cross linked polyethylenic containing composition. It is significant that the cured, thermosetting composition is characterized by a tensile strength at 150° C. of not less than 800 pounds per square inch and a dielectric strength of not less than 1,000 volts per mil. This is a significant advance in the art in that the composition can be fabricated as in insulation layer for a wire and cable at a wall thickness of one sixty-fourth inch. A wire made with the insulation of this invention at a wall thickness of one sixty-fourth inch having no braid or sheath and tested persuant to Underwriters' Laboratories heat aging standard has achieved a rating of 105° C., which has heretofore been accomplished with a cross linked polyethylenic insulating composition having twice the wall thickness, e.g. one thirty-seconds inch.

In the following example, which further illustrates my invention, an insulation composition was prepared by working in a Banbury 91.6 parts of a copolymer comprising 83 percent by weight polyethylene and 17 percent by weight vinyl acetate, together with 8.4 parts of chlorinated polyethylene, 0.9 parts calcium stearate as a lubricant, 2.8 parts lead phthalate stabilizer, 3.7 parts coloring pigment and 1.5 parts of polytrimethyl-dihydroquinoline as the antioxidant, at a mill temperature of about 200° F. to 250° F. until the admixture is banded on the mill roll. 72.5 parts of magnesium silicate filler sold under the trade name of MISTRON VAPOR TALC and 0.9 parts of vinyl tris (2-methoxy ethoxy) silane were added and the Banbury compounding operation continued until the admixture was substantially homogeneous. As soon as the composition on the mill became uniform, and the temperature regulated to about 220° F. to 230° F., 3.2 parts of di-α-cumyl peroxide were added and worked into the composition as in the case of the previous additives. The compounded composition was then stripped from the mill, cooled to room temperature, granulated by conventional means and then used as a feed for a convention extruder for extruding insulation material on wire.

The compounded composition was extruded at a wall thickness of one sixty-fourth inch on number 18 AWG solid conductor at an extrusion speed adjusted to give a 15—20 seconds dwell time for curing in a steam chamber maintained at about 400° F. and 250 p.s.i.g.

This product was evaluated by comparison to a standard neoprene coated wire comprising a one thirty-seconds inch wall of neoprene on a number 18 AWG solid conductor. The tests results set forth in the following table illustrate the excellent performance characteristics of the product of this invention, and shown in many respects the superior performance or equivalent performance for wire insulation having one-half the wall thickness as that required for neoprene.

PHYSICAL TESTS AND PERFORMANCE CHARACTERISTICS

| | New product | Neoprene |
|---|---|---|
| Wall Thickness, inch | 1/64 | 1/32 |
| Original physicals: | | |
| Tensile strength | 2,780 | 1,550 |
| Elongation, percent | 210 | 600 |
| Physicals at 150° C.: | | |
| Tensile strength | 1,182 | 405 |
| Elongation, percent | 140 | 350 |
| U. L. Horizontal Flame: | | |
| Burned-distance, inches | ±2 | ±1 |
| Dripping flamming particles | None | None |
| Plastic flow at 135° C., kv. to fail, kv | 20.1 | 18.3 |
| Dielectric strength: | | |
| Volts per mil—H₂O at RT | 1,250 | 600 |
| Insulation resistance: | | |
| Megohms/1,000 ft., 20 hours at 15.6° C | 3,192 | 139 |
| At 15.6° C. after seven days at 75° C. H₂O | 4,456 | 46 |
| Ozone, 0.03% conc., ¼" mandrel | (1) | (2) |
| Mechanical water absorption, mgm./in.² | 5 | 125 |
| Heat aging—elongation: | | |
| 17 days at 136° C., percent orig | 58 | (3) |
| 90 days at 113° C., percent orig | 74 | (3) |

1 No cracking after 3 months.
2 Failed within 3 hours.
3 Brittle.

The horizontal flame test is established by Underwriters' Laboratories "Standard for Safety, Rubber Insulated Wires and Cables," U.L. 44, 6th Edition. This test measures the speed with which a flame progresses along a horizontal specimen of finished wire or cable and requires that no flaming drops or particles shall fall from the specimen during or after application of the test flame. The results from this test show that for thin walled applications for use as lead wire in fluorescent lamp ballast, for example, the insulation product of this invention performed satisfactorily.

In the plastic flow test, a cable or wire sample 22 inches in length is cut and stripped 1 inch back from each end. A polished brass rod one-eight inch in diameter and suspended by means of a hook. The cable is looped through the brass ring and the stripped ends of the cable are fastened together. The cable loop is suspended from the brass ring with a 3 pound weight hanging from the cable loop. This is then heat aged for 6 hours at 135° C. in a well ventilated oven. The sample is then cooled for 1 hour at room temperature. Six thousand volts AC are applied for 1 minute between the cable conductor and the brass ring.

In the dielectric test, a sample 2 feet long is cut and stripped back 1 inch from each end of the sample. The sample is wrapped on a one-fourth inch diameter mandrel in such a manner that the butting adjacent cable turns against each other. The cable sample is unwrapped from the mandrel and the procedure is repeated, wrapping the cable in the opposite direction on the mandrel. The sample is then removed from the mandrel and immersed in tap water at temperature of 20° to 25° C. in such a manner that the stripped ends of the leads are out of the water. Six thousand volts AC are applied between the cable conductor and the water for 1 minute.

The insulation resistance test is conducted pursuant to Underwriters' Laboratories Standard No. 44, "Standards for Insulated Wires and Cables," 6th Edition, 1961. According to this test, 50 feet of wire is immersed in water maintained at 15.6° C. for 20 hours, and the resistance measured, and then in water at 75° C. for 7 days and then cooled in 15.6° C. and the resistance measured again. This test is important in demonstrating the humidity stability of the insulation, and the tests results show the superior performance of the new product for the invention.

The ozone test is established by I.P.C.E.A., under Standard No. S-19-81, paragraph 68, 5th Edition, January, 1964. The tests samples were observed at the end of 3 hours, the designated test period, and the neoprene sample failed showing noticeable cracking while the invention product showed no cracking even after 3 months.

In the mechanical water absorption test, established by Underwriters' Laboratories Standard No. 44, "Rubber-Insulated Wires and Cables," Appendix A-2, 6th Edition, May 1961, the wire is immersed in water at 70° C. for 7 days. Here again, the product of the invention demonstrated superior performance.

The heat aging test also was conducted pursuant to Underwriters' Laboratories Standard No. 44, "Rubber Insulated Wires and Cables," 6th Edition, 1961. The insulation for the wire of this invention passed the test thereby providing approval for the wire for continuous service at 105° C.

I claim:

1. A cross linked insulation composition suitable for wire and cable consisting essentially of:

a. an ethylene copolymer having about 75 percent to 90 percent by weight of ethylene;

b. a chlorine-containing polymer in sufficient quantity such that the chlorine content is not less than about 2 percent by weight of the combined weight of said polyethylene copolymer and said chlorine-containing polymer;

c. a filler consisting essentially of magnesium silicate having a platelike structure and a particle size not greater than 6 microns and coated with an alkoxy silane, said filter comprising at least 25° percent by weight of said composition; and d. said composition characterized upon cross linking by a tensile strength at 150° C. of not less than 800 pounds per square inch and a dielectric strength of not less than 1,000 volts per mil.

2. A composition according to claim 1 wherein said ethylene copolymer comprises ethylene and vinyl acetate.

3. A composition according to claim 1 wherein said chlorine-containing polymer is chlorinated polyethylene.

4. A composition according to claim 1 wherein said filler was coated with about 0.2 percent to 3 percent by weight of said alkoxy silane.

5. A composition according to claim 1 wherein said alkoxy silane is a vinyl silane and said filler was coated with about 0.2 percent to 3 percent by weight of said vinyl silane.

6. A composition of matter consisting essentially of:
 a. a copolymer of ethylene and vinyl acetate having such 75 percent to 90 percent by weight of ethylene;
 b. chlorinated polyethylene in sufficient quantity such that the chlorine content is in the range of from about 2 percent to 8 percent by weight based on the combined weight of said copolymer and said chlorinated polyethylene;
 c. a filler consisting essentially of magnesium silicate having a platelike structure and a particle size not greater than 6 microns and coated with about 0.2 to 3 percent by weight of a vinyl silane, said filler comprising at least 25 percent by weight of said composition; and
 d. said composition characterized upon cure as thermosetting, by a hot tensile strength of not less than 800 pounds per square inch and a dielectric strength of not less than 1,000 volts per mil.

7. A composition according to claim 6 wherein said copolymer contains about 80 percent to 85 percent by weight ethylene, and said chlorine content is in the range of from about 3 percent to 5 percent by weight.

8. Electrical cable comprising a conductor and a coating of insulation on said conductor consisting of a composition as claimed in claim 1.

9. Electrical cable comprising a conductor and a coating of insulation on said conductor consisting of a composition as claimed in claim 6.

10. Electrical cable comprising a conductor and a coating of insulation on said conductor consisting of a composition as claimed in claim 7.